US008266101B1

(12) United States Patent
Shuai (10) Patent No.: US 8,266,101 B1
(45) Date of Patent: Sep. 11, 2012

(54) SHARE NOTHING DATABASE CLUSTER AND REAL TIME SYNCHRONIZATION BY SIGNALING

(76) Inventor: Binpeng Shuai, Dublin, OH (US)

( * ) Notice: Subject to any disclaimer, the term of this patent is extended or adjusted under 35 U.S.C. 154(b) by 454 days.

(21) Appl. No.: 12/460,280

(22) Filed: Jul. 16, 2009

(51) Int. Cl.
*G06F 17/30* (2006.01)
(52) U.S. Cl. ........................................ 707/610
(58) Field of Classification Search .................. 707/610, 707/637, 640, 648, 672, 634, 661
See application file for complete search history.

(56) References Cited

U.S. PATENT DOCUMENTS

| | | | |
|---|---|---|---|
| 6,272,675 B1* | 8/2001 | Schrab et al. | 717/100 |
| 7,143,123 B2 | 11/2006 | Tom et al. | |
| 7,788,224 B2* | 8/2010 | Fleck et al. | 707/623 |
| 2005/0193056 A1* | 9/2005 | Schaefer et al. | 709/203 |
| 2007/0027896 A1* | 2/2007 | Newport et al. | 707/102 |
| 2007/0143247 A1* | 6/2007 | Brunswig et al. | 707/2 |
| 2007/0198518 A1* | 8/2007 | Luchangco et al. | 707/8 |
| 2007/0226277 A1* | 9/2007 | Holenstein et al. | 707/204 |
| 2009/0138531 A1* | 5/2009 | Horii | 707/204 |
| 2009/0271667 A1* | 10/2009 | Onitsuka et al. | 714/57 |
| 2010/0030730 A1* | 2/2010 | Shang et al. | 707/2 |
| 2010/0030824 A1* | 2/2010 | Shang et al. | 707/204 |

\* cited by examiner

*Primary Examiner* — Cam-Linh Nguyen (57) ABSTRACT

A transaction signaling method in data replication and synchronization that detects the transaction, reads the signal, and based on the signal value it either simply clears the signal or sends a signal to each of its remote databases in the cluster, tells the remote database that next transaction is originated from the signaling layer of another database, and applies the same transaction to the remote database. Unlike current technologies, this technology allows updates at all databases in the cluster simultaneously. It provides users with a method to not only scale out the reads, but also scale out the updates. It synchronizes the databases in the cluster in real-time and eliminates the need of database backups. It not only increases the availability of data but also offers zero data loss when a disaster happens. It may also improves the performance on updates because it eliminates the overhead of cache transfer existed on conventional clustering technologies such as Oracle Real Application Cluster that share the same storage.

4 Claims, 9 Drawing Sheets

SITE_INFO TABLE

| SITE_ID | NUMBER |
|---|---|
| SITE_NAME | VARCHAR2(32) |
| DB_NAME | VARCHAR2(32) |
| IS_CLUSTER (is the DB at this site a conventional cluster?) | NUMBER |
| SITE_MODE(active or passive) | NUMBER |
| SITE_STATUS | VARCHAR2(4) |
| LAST_DOWN_TIME | TIMESTAMP |
| HAS_TL | VARCHAR2(4) |
| IS_LOCAL | NUMBER |
| SERVICE_NAME | VARCHAR2(32) |

902

S900

TRANSACTION_QUEUE TABLE (ONLY STORES TRANSACTIONS FOR CRASHED SITES)

| TRAN_ID | NUMBER |
|---|---|
| TABLE_OWNER_NAME | VARCHAR2(32) |
| TABLE_NAME | VARCHAR2(32) |
| SOURCE_SITE_ID | NUMBER |
| DEST_SITE_ID | NUMBER |
| TRAN_TIMESTAMP | TIMESTAMP |
| OP_CODE | CHAR (I, U, OR D) |
| DATA | BLOB (optional, used to hold :new & :old data when apply) |

904

OWNER1.T1 (an example source table)

| COL1 |
|---|
| ... |
| COLn |

906

OWNER1_T1 TABLE
(an example synchronization table for the source table T1)

| TRAN_ID |
|---|
| TABLE_OWNER_NAME |
| TABLE_NAME |
| SOURCE_SITE_ID |
| DEST_SITE_ID |
| TRAN_TIMESTAMP |
| OP_CODE |
| VERION (OLD (0) | NEW (1)) |
| COL1 |
| COL2 |
| ... |
| ... |
| COLn |

SHARE NOTHING DATABASE CLUSTER AND REAL TIME SYNCHRONIZATION BY SIGNALING

CROSS-REFERENCE TO RELATED APPLICATIONS

Not Applicable

FEDERALLY SPONSORED RESEARCH

Not Applicable

SEQUENCE LISTING

Not Applicable

PROGRAM

In order to help in understanding the specification, a CD-ROM disc with simpler example programs is provided. To see the contents of the disc, please see the APPENDIX.

APPENDIX

The CD disc has one file README.txt and two directories: directory column_signaling and directory ctx_signaling.

Under the directory column_signaling, there are following files: README.txt, create_link2xedb01.sql, create_link2xedb02.sql, test_table_del_trg_xedb01_v2.sql, test_table_del_trg_xedb02_v2.sql, create_shuai.sql, test_table_trg_xedb01_v2.sql, create_table_tables.sql and test_table_trg_xedb02_v2.sql.

Under the directory ctx_signaling, there following files: README.txt, create_link2xedb01.sql, create_link2xedb 02.sql, create_shuai.sql, right_to_shuai.sql, my_ctx.sql, test_table_trg_xedb01_v2.sql and test_table_trg_ xedb02_v2.sql.

BACKGROUND

1. Field

This invention is related to data synchronization, database clustering and database disaster recovery in networked computing systems. The invention is based on database transaction level signaling. More specifically, the invention relates to database synchronization, replication and clustering by using statement level signaling and database triggers to embed a synchronization layer into the databases in the cluster so that the layer and the database become an integral part. The signaling process is implemented in database DML triggers. However, this limitation does not apply to database vendors and it can be implemented in any layer where it is deemed appropriate in their databases and make it cleaner.

2. Prior Art

Data replication is the process of maintaining multiple copies of a database object in a distributed database system. IT industries widely use the one-way replication to maintain multiple database copies to increase the system read capacity and offload the load of the primary database. However, this does not help in increasing the update capacity. Moreover, IT industries often face disaster problems and they usually have to buy services from companies such as SunGard Inc. to protect their data and the services that they purchase can not be effectively utilized since disasters nearly never happens. Even if it happens, it usually takes hours, even days, for the system to come up with limited capacity and certain data loss.

Conventional clustering technologies such as Oracle Real Application cluster, in which multiple instances share the same physical storage, have significant performance problem when dealing updates. Their intrinsic waits on cache transfer are the performance killer and prevent update transactions from scaling out. The conventional cluster cannot prevent disaster from happening due to their use of shared storages either. So these database clustering technologies all have their own performance drawbacks and cannot survive disaster failures without data loss.

U.S. Pat. No. 7,143,123 to Tom, Richard (2006) disclosed a process that would do the synchronization among multiple databases, but it needs to implement multiple external log reader agents and distribution agents to harvest and distribute transactional data. Its transaction tagging method is not very efficient. The implementation would not only be complicated, but also be expensive to deploy. It may also incur performance problem due to its use of many external agents. Due to the fact that its trigger based method has to store the transaction in the harvest agents, the process could not utilize the two-phase commit or equivalent feature of existing database technologies, it may not be able to guarantee read consistency. This implies that it could not guarantee the data consistency if updates are allowed on more than one database in its replication group.

Therefore, there is a need for a straightforward and cost-effective way to implement synchronous/real-time database synchronization system that would not only increase the read capacity, but also eliminate cache transfer waits in existing database cluster technology and increase the update capacity and at the same time provide database disaster protection without data loss and downtime.

SUMMARY OF THE INVENTION

The following describes a simplified summary of the invention to provide a basic understanding of the invention. It is not intended to identify the key components of the invention.

Active-Active bidirectional database synchronization in the present invention is based on transactional signaling inside, but not limited to be used in, database triggers created to the database tables. When a DML trigger at the originating database fires, it performs the same DML to its peer databases and that will cause the corresponding triggers at the peer databases to fire. Under normal condition, it would create dead loop and hence it is not feasible. However, with the introduction of transaction signaling, it becomes very efficient and very easy to implement. It works as follow: at the originating database, when a trigger fires, it checks to see if there is a signal set in its database (normal JDBC or other clients would not set this signal by default and they do not even know the underline change), if it does not exist, first, it sets/sends a signal to its peer databases via database link (as defined in oracle database) or oracle database link equivalent technologies provided by database vendors; second, it performs the same DML at the peer database; and third, when the corresponding trigger fires at the peer database, the trigger finds that there is a signal exist and knows that transaction is not originated locally and simply clear the signal and exits from the trigger body. After the trigger at the originating database exits and the transaction is either committed or rolled back, all databases in the cluster are in synchronization. Since the DML triggers use the database link or equivalent technologies provided by different database vendors and their two-phase commit and distributed computing features, the read consistency is naturally preserved and data consistency is guaranteed. When the synchronization layer detailed in the prevent invention is implemented, it is possible for database vendors to add a key word such as no-synch to their SQL DML/DDL statements to indicate where synchronization should be applied: insert into table_t (col1, col2, ... , coln) values (val1, val2, ... valn) [no-synch] and update table_t set col1=val1, col2=val2 where . . . [no-synch]. When the key word is omitted, the transaction is synchronized among all databases in the synchronization group. When the key word is present in the DDL/DML statement, the transaction is local to the originating database and the transaction is not propagated to its peer databases. This function is good for fixing data locally.

To better describe the signaling mechanism, certain illustrative aspects of the invention are described herein in connection with the following description and the annexed drawings. These aspects are indicative of a few ways in which the principles of the invention may be employed and the present invention is intended to include all such aspects and their equivalents. Other advantages and novel features of the invention may become apparent from the following detailed description of the invention when considered in conjunction with the drawings.

DRAWINGS

Figures

DETAILED DESCRIPTION

The present invention is now described with reference to the drawings, where like reference numbers are used to refer to like elements throughout. In the following description, many specific details are set forth to provide a thorough understanding of the present invention. With the detailed logical diagrams, it may be evident for the present invention to be practiced without these specific details by engineers familiar in the art.

As used in the specification, the term "system" refers to a computer-related entity. It could be hardware, software or a combination of hardware and software. The term "server" refers to a system that provides services to other systems. The term "database cluster" refers to a system consisting of a group of database instances that share the very same data storage (the conventional clustered database system like Oracle Real Application Cluster). However, the term "database cluster" described in the present invention does not share storage and it may contain a conventional database cluster as a member of the synchronization group.

In accordance with the disclosed architecture, N nodes can be connected in a mesh topology. The data can be kept consistent among the nodes in the cluster by the triggers in the transaction origination node applying the same transaction to each of the other nodes directly. Traditionally, this is not possible since it would create a dead loop of trigger events: Database A is updated, its corresponding trigger TA is fired; the trigger TA applies the same transaction to database B that causes its corresponding trigger TB to be fired; the trigger TB then applies the transaction again to database A and dead loop is created. With the transaction signaling methods described in the present invention, the cyclic trigger events can be prevented and data can be kept consistent. The disclosed architecture can also allow ring configuration if the signal carries originating site identification and traverser direction and increase fault tolerance. However, in a mesh topology, the signal is not required to carry such information.

The disclosed architecture can also allow both active and passive modes to exist at same time. However, the nodes in passive mode cannot apply transactions to nodes in active mode in the cluster. The passive nodes are synchronized by a separate thread that either pulls or pushes the transactions logged in the transaction logs. The passive mode allows database sites over a real long distance (long enough that would hurt system performance) to be synchronized to give extra disaster protection and satisfies the requirement that a separate database copy needs to be hosted locally by some European countries.

Figure 1:
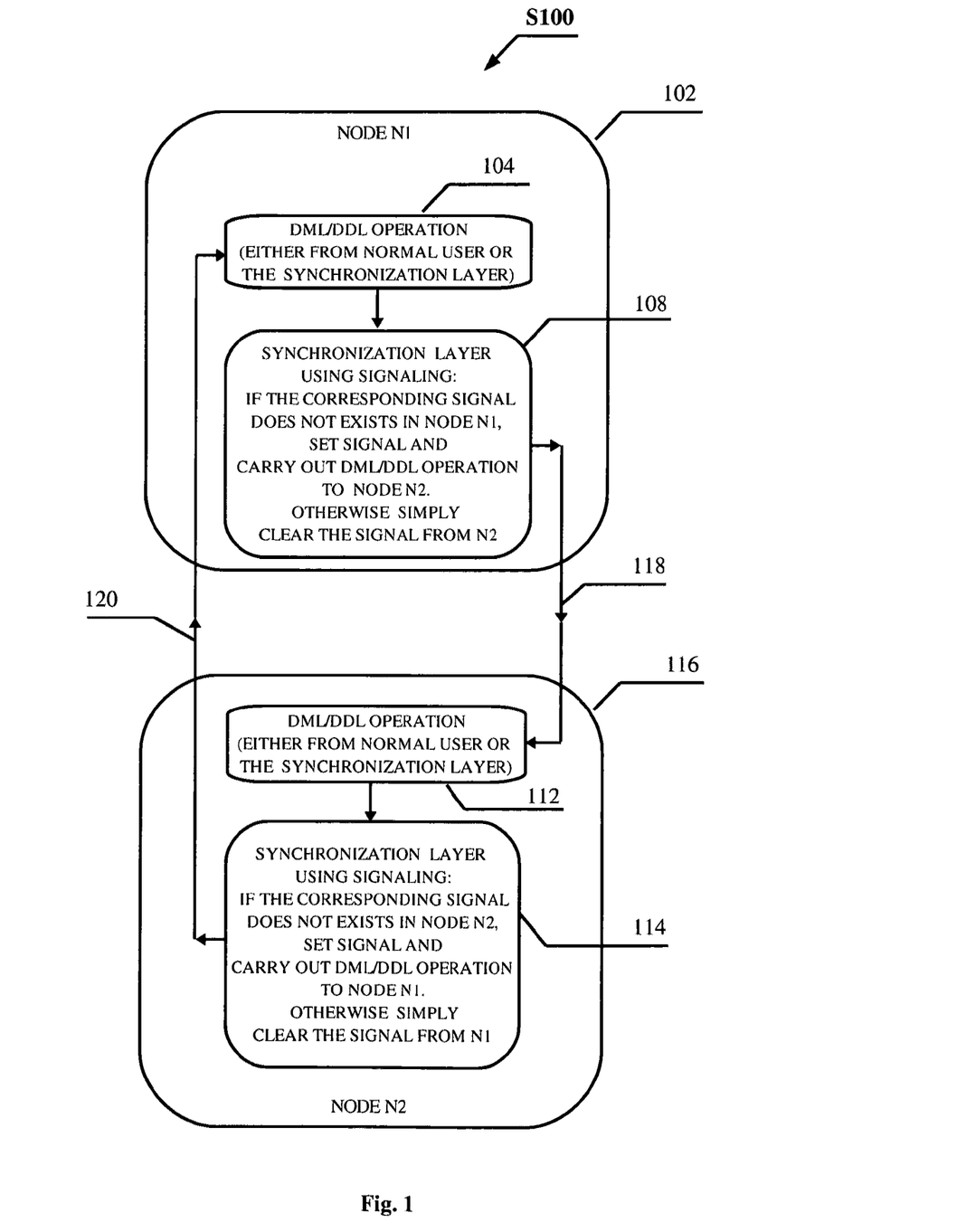
FIG. 1 shows a system that facilitates data replication/synchronization in a data network in accordance with the present invention.

Now referring to FIG. 1, the illustrated system S100 facilitates data synchronization in a network in accordance with the present invention. The system S100 consists of node 102 and node 116. Each node includes a synchronization layer (108 and 114) built into the databases in a database synchronization network. The layer 108 and its peer layer 114 perform two major operations after its database receives a DML/DDL operation (104 and/or 112): send a transactional signal to its peer that the transaction is not originated locally and carry out the same DML/DDL to their peer databases if there is no signal exists in its own databases. In order to ensure the read/write consistency, the DML performed in the synchronization layer is done using Oracle database link (118 and/or 120), its equivalent features provided by the database vendor or a link that facilitates two-phase commit protocol. However, the signal can be sent by using existing technologies such Oracle database link or its equivalent technology provided by the corresponding database vendors or a mechanism using database vendor provided TCP/UDP component (such as oracle utl_tcp package). In the following paragraphs, four different ways of signaling processes will be detailed and three of them are provided in the companion CD disk as simple working examples. The examples are based on Oracle 10 g XE (Express Edition) and written in oracle PL/SQL.

A signaling server is a component that holds the signals and their value. It can simply contain a lookup table where the signals are stored. The signal server can be database(s) in active mode in the synchronization group in the present invention.

Here is illustrated how signals are identified by database sessions. The signal identifier or key has be to unique in its scope. Below specifies three signal scopes: global scope where signals are visible by all sessions in a shared signal server design, database instance level scope where signals are visible by all sessions within the database instance and session level scope where signals are only visible by the triggering session. Depending on database technologies, each of the three scopes may be considered.

In the shared signal server design or global signaling scope design, the signal can be identified as (the hash value of) the concatenation of the following data: site id, table owner name, table name, row data or just the concatenation of the column values of a unique index of the table in the order of the index column positions. The fields should be separated by a field separator when the data are concatenated to ensure uniqueness of the signal identifier. The signal identifier can even be the (hash value of) concatenation of site id and rowid if the databases in the group have same exact data structure.

In database level signaling scope signaling design (where a signal server may be the database itself or an external server associated with the database), the signal identifier can be specified as (the hash value of) the concatenation of table owner name, table name, row data or just the concatenation of the column values of a unique index of the table in the order of the index column positions. As in the shared signal server design, the fields should be separated by a field separator when the data are concatenated to ensure uniqueness of the signal identifier. A typical example of using database as a signal server is using features provided by database vendors such as Oracle context. Another example is using a dedicated table signal_table(signal_name varchar2[32], signal_value varchar2[64]) in the database, although this may not be as efficient as using global context. The signal identifier can even be the rowid if the databases in the group have same exact data structure.

In session level signaling scope design where signals can only be accessed by the database session, the signal identification can have a fixed token, say, "signal". A typical example is using Oracle session context to store the signal.

the signal identifier specified in the shared signal server design can be used in the case as specified in the database level signaling scope design and the case as specified in the session level signaling scope design, and the signal identifier specified in database level signaling scope design can also be used in the case as specified in the session level signaling scope design.

If the signaling method is used to support ring configuration, the value of the signal should consist of, however it is not limited to, (the hash value of) the originating site identification with traversing direction. In mesh topology, the value of signal can be anything. It merely serves as a flag.

Figure 2:
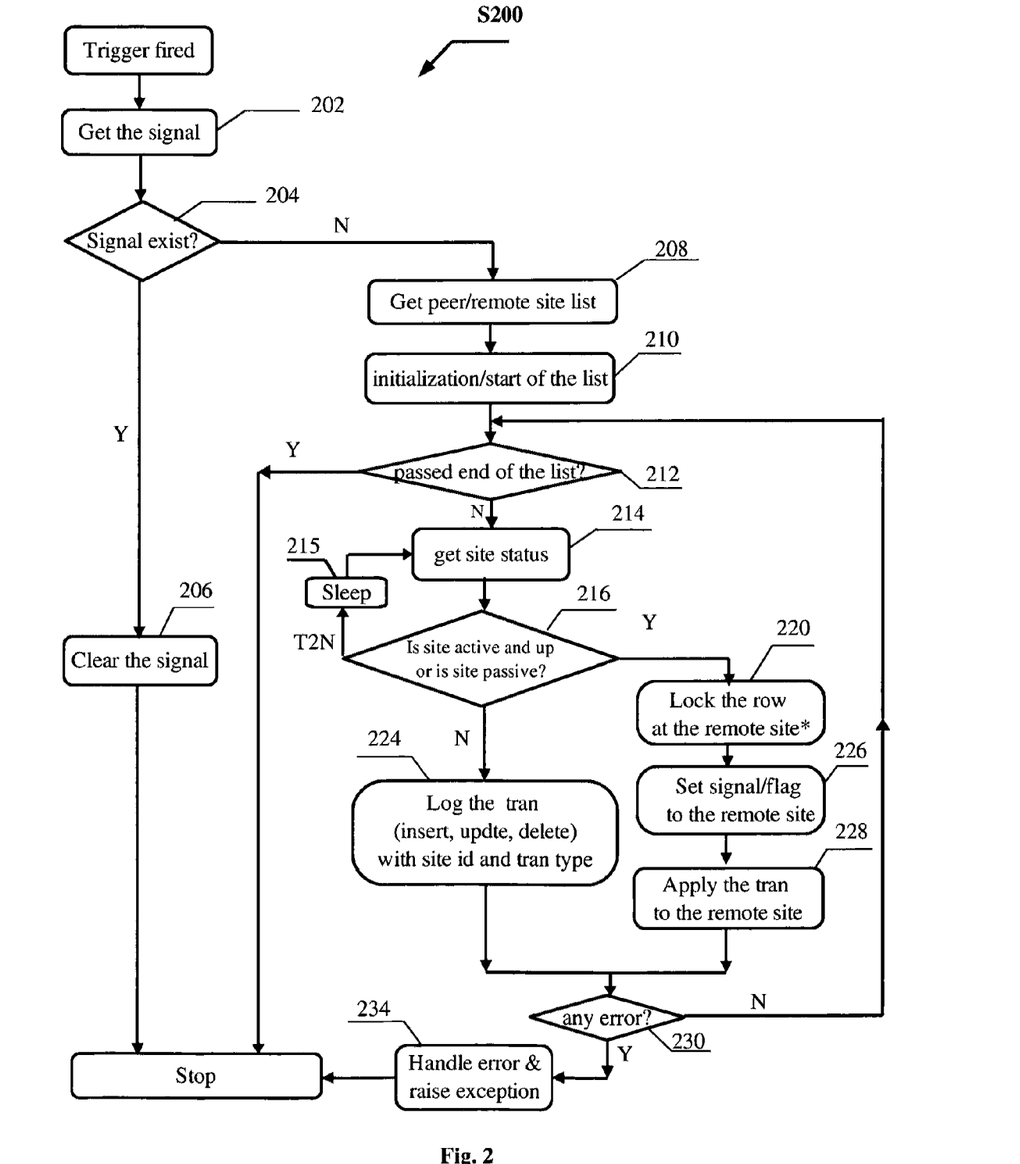
FIG. 2 shows a flow chart of a block diagram of a system using the signaling mechanism without changing database table definition according to the present invention.

Now referring to FIG. 2, there is illustrated a logical block diagram 5200 for three signaling cases: using database context (either global or session context in Oracle database, or its equivalent technology in other databases), using a single signaling table defined each database in the synchronization group and using external signaling servers. The first two methods can be found in the provided program listing CD disk. For illustration purposes, the flow starts in, but not limited to, a DML trigger. In system S200, when a DML operation is received at a database, it fetches the signal from the signal server at 202. At 204 it checks the signal fetched at 202. if the signal does not exist, it takes the N branch and proceeds to 208 where it gets a list of peer/remote database sites. It then loops through the site list, and for each site it reads the site status at 214 and checks the site status at 216, and if the site is active mode and running, it proceeds to 220 where it locks the row at the remote site using select . . . from the_corresponding_table@the_remote_site for update (except for insert statement unless using an global lock server since the row does not exist yet). After the lock is granted, it proceeds to 226 where it sends a signal to the remote site using send_signal(signal_name)@the_remote_site, it then proceeds to 228 where it applies the same transaction to the remote site using [insert|update|delete] table@the_remote_site. If at 216 the layer finds that the site is in passive mode or in active mode with down or recovering status, it logs the transaction at 224. If at 216, the status is T2N (transitioning to normal) status, it takes the T2N branch to 215, sleeps for a short period and then proceeds to 214 and re-checks the status. At 230, it checks for error or traps exception thrown and if any error/exception happened in 220, 224, 226 and 228, it handles the error or exception, exits from the loop and raises an exception so that user can handle it and exits. If at 204, there is a signal for this transaction, it knows that this transaction is either from a remote site, and it simply clears the signal and exits. After the whole block finishes and user performs a commit or rollback, the databases in the synchronization group are synchronized. It is optional and may be better to create another loop and move 220 into the loop so that all related rows in the remote databases are locked before any update/delete is carried out at the remote databases.

If a database does not have the equivalent feature as Oracle context. Signaling using external signal server(s) may be desirable. The external signal servers are connected with databases over a network. It can reside in the same machine where a database is running.

Figure 3:
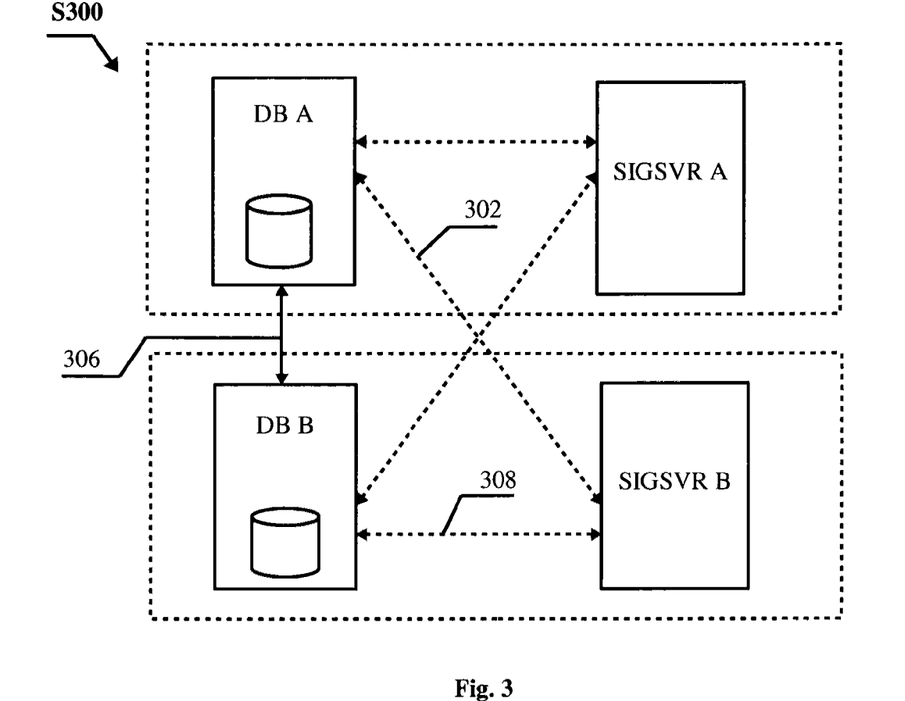
FIG. 3 shows a flow chart of a two-node system using external signal servers in accordance with the present invention.

Now referring to FIG. 3, there is illustrated signaling method 5300 using associated external signal server. As configured in this figure, each database has a companion signal server. When DB (database) A receives a user transaction, its synchronization layer sends a signal, one for each remote database in the synchronization group if there are more than three nodes in the cluster, to the signal server SIGSVR B over 302 and then applies the same transaction to DB B via 306. The synchronization layer at DB B checks if the corresponding signal exists at SIGSVR B via 308, and it then finds that the signal exists, clears the signal in SIGSVR B and exits from the synchronization layer.

Figure 4:
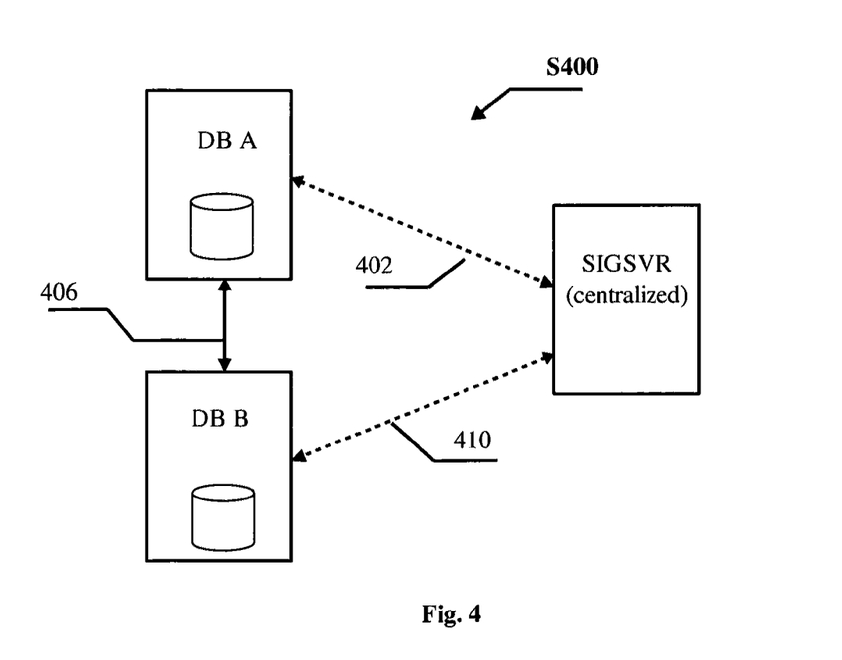
FIG. 4 shows a flow chart of a two-node system using external centralized signaling server.

Now referring FIG. 4, there is a system that facilitates the signaling method at the synchronization layer using a shared external signal server. When DB A receives a DML operation, the synchronization layer sends a signal as specified in the shared signal server design for DB B (that is, the signal identifier has the site identification of DB B and the row information) to SIGSVR via 402 if there is no corresponding signal exists at SIGSVR for DB A, it then performs the corresponding DML to DB B via 406, which activates the synchronization layer at B, the layer at B finds that there is a corresponding signal exist via 410 in the signal server SIGSVR and exits from the its synchronization layer. At the end, the data at all databases in the synchronization group is in synchronization.

The signaling methods illustrated so far do signaling using database context (user definable global parameters), dedicated database tables, and external signal servers. Now another signaling method, called in-statement signaling method, is disclosed without using any of such. A signaling column named spare (can be any name) is added to each table in the databases. Database vendors can either hide it so that it is not visible from users, directly embed the signal information in their transaction data, or specify a key word in the DML statements where synchronization among the synchronization group is default in the DML statement (for example: insert into table_t (col1 ,col2, . . . , coln) values (val1, val2, . . . valn) [no-synch] and update table_t set col1=val1, col2=val2 where . . . [no-synch]). The value of the column should contain the site identification and traversing direction if ring topology is to be supported. For the purpose of explaining the logical diagrams, the value of the column is assumed to 1 or 0 (null is treated as 0) which is enough to support mesh topology.

Figure 5:
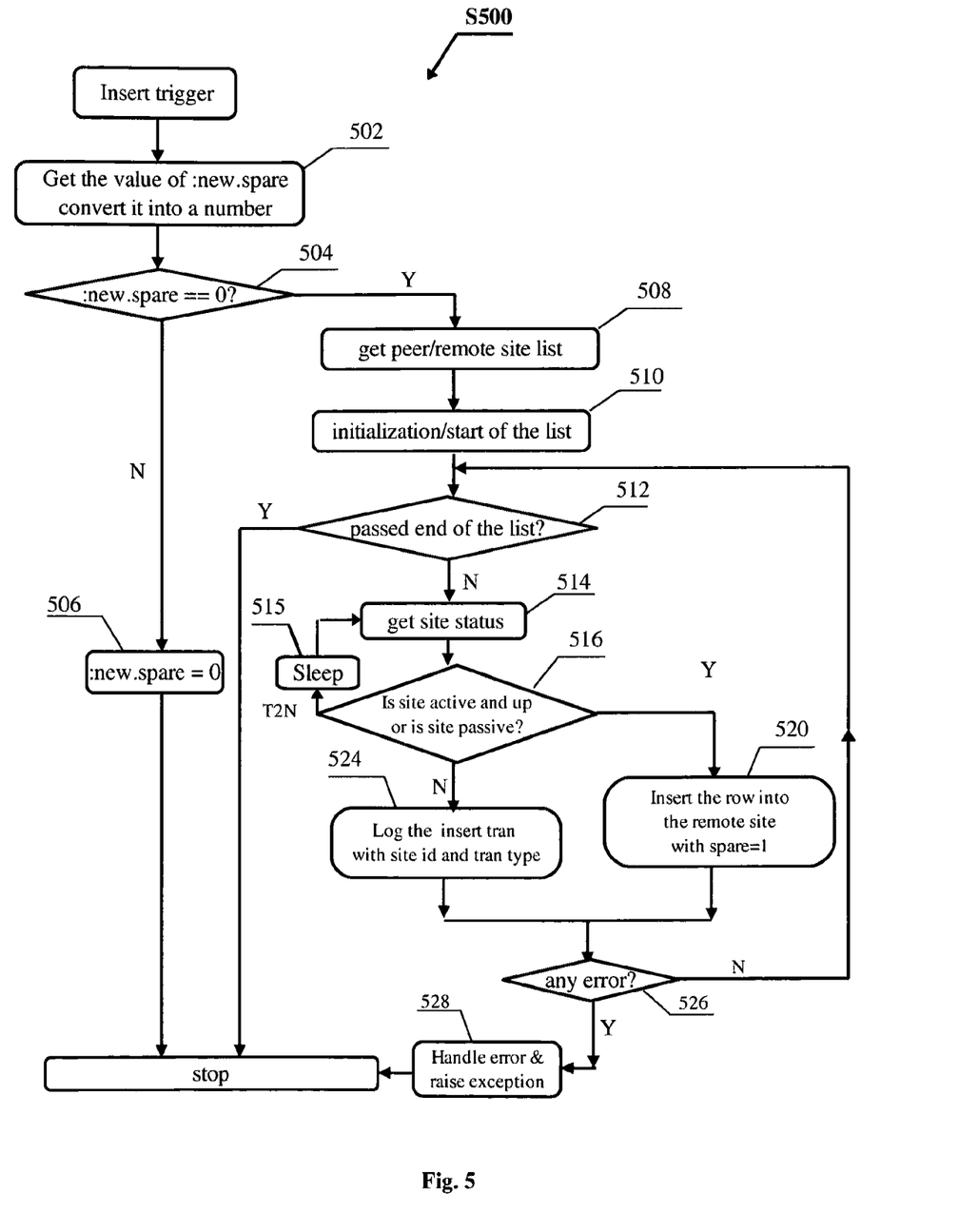
FIG. 5 shows a block diagram of a system using a database table column to do synchronization signaling for the database insert transactions.

Now referring to FIG. 5, there is a logical block diagram for the insert transaction of a system S500 that facilitates the signaling method described in the in-statement signaling method. That an insert statement is issued against the database causes the associated trigger to be fired. At 502, it gets the value of the spare column and if the value of spare is null it is converted into 0. At 504, if :new.spare is 0, it means that the insert is issued by a user and is not issued from within the synchronization layer, it takes the Y branch to 508. At 508, it gets the list of remote/peer sites in the synchronization group. At 510, it initializes the list and starts looping from the beginning of the list. At 512, if it does not pass the end of the list, it takes the N branch and proceeds to 514 where it gets the status of site. At 516, it checks the site status. If it is in active mode and running, it proceeds to 520 via the Y branch where it inserts the same row into the remote site with spare=1 (insert into table_XXX values (val1, val2, . . . valn, spare=1). If at 516, it finds the site is in passive mode or in active mode with status down, it takes the N branch to 524 and logs the insert transaction there. If at 516, the status is T2N (transitioning to normal) status, it takes the T2N branch to 515, sleeps for a short period and then proceeds to 514 and re-checks the status. At 526, it checks for error/exception, if there is no error/exception, it proceeds to 512 again and process the next site. If at 526, there is an error or an exception thrown, it takes the Y branch, handles the error and raises the exception at 528 and then exits from the synchronization layer. If at 512, it finds that it has processed all remote sites, it takes the corresponding Y branch and exits from the synchronization layer. If at 504, it finds :new.spare is not 0, it means that the insert transaction is originated either from synchronization layer or the user does not want to it to be propagated to remote sites, it simply resets it to 0 at 506 and exits from the layer. 506 is performed only if the layer is implemented in a before trigger and has to be taken out in an after trigger since the after trigger usually does not allow modification to the row data. However, this limitation does not apply to database vendors since they have access to their source code and can implement it anyway which is proper. After the synchronization layer completes, the insert transaction is synchronized among all database sites in the group.

Figure 6:
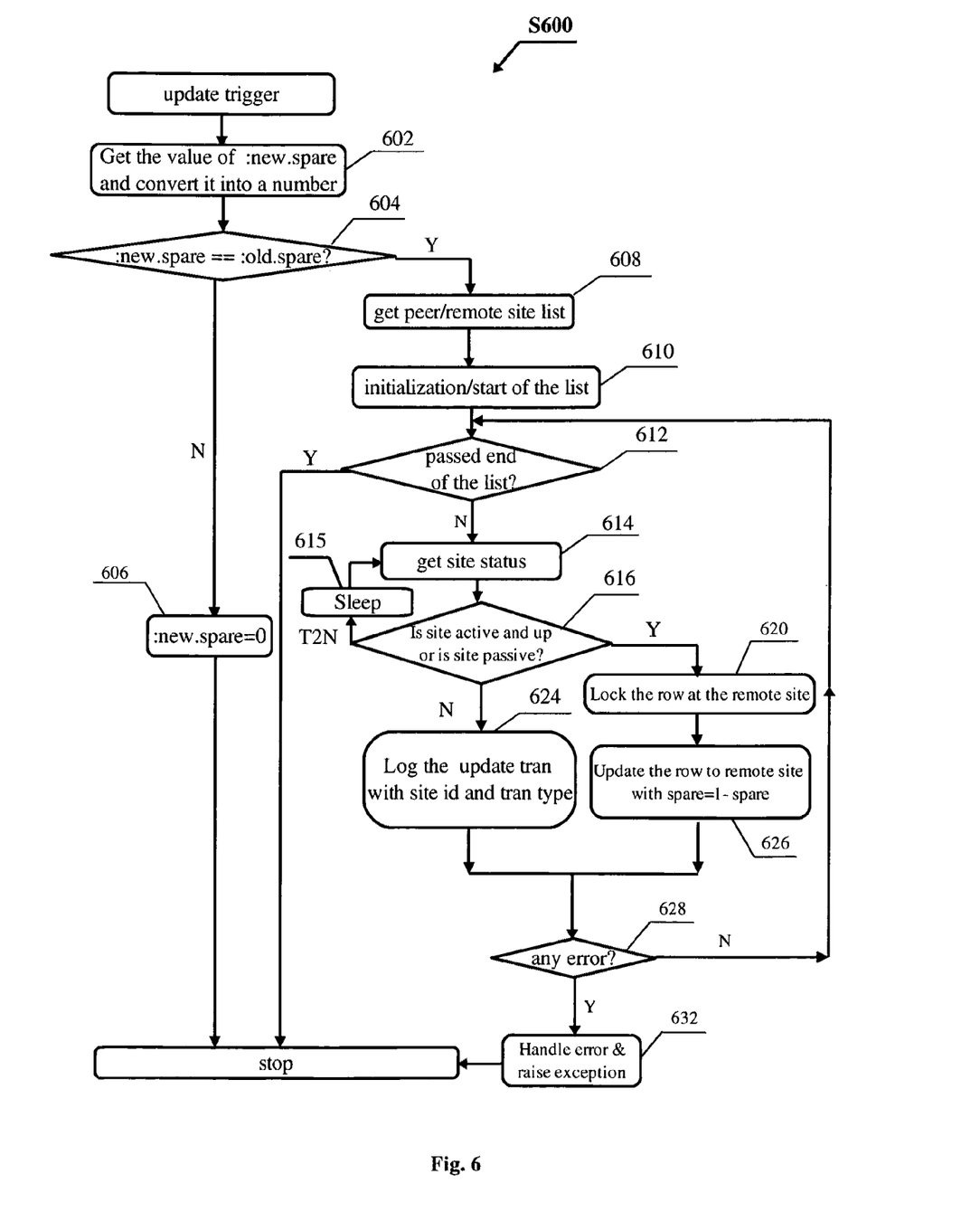
FIG. 6 shows a block diagram of a system using a database table column to do synchronization signaling for the database update transactions.

Now referring to FIG. 6, there is a logical diagram for the update transaction of a system S600 that facilitates the signaling method as described in the in-statement signaling method. That an update statement is issued against the database causes its associated trigger to be fired. At 602, it gets the value of the spare column and if the value of spare is null it is converted into 0. At 604, it checks if :new.spare is the same as the old value :old.spare. If the two values are the same, it means that the update statement is issued by a user and is not issued from within the synchronization layer and it should be synchronized, and it takes the Y branch to 608. At 608, it gets the list of remote/peer sites in the synchronization group. At 610, it initializes the list and starts looping from the beginning of the list. At 612, if it does not pass the end of the list, it takes N branch and proceeds to 614 where it gets the status of the current site. At 616, it checks the site status. If it is in active mode and running, it proceeds to 620 via the Y branch where it first locks the corresponding row in the remote database/site and then updates the same row to the remote site with spare=1−spare (which toggle the value of spare at the destination database by the SQL statement "update table_XXX@remote_database set col1=val1, col2=val2, . . . coln=valn, spare=1-spare where the where_clause"). If at 616, it finds the site is in passive mode or in active mode with status down, it follows the N branch to 624 to log the update transaction for the remote site. If at 616, the status is T2N (transitioning to normal) status, it takes the T2N branch to 615, sleeps for a short period and then proceeds to 614 and re-checks the status. At 628, it checks for error/exception, if there is no error/exception, it proceeds to 612 again and processes the next site. If at 628 there is an error or an exception thrown, it takes the Y branch to 632, handles the error, raises the exception at 632 and then exits from the synchronization layer. If at 612, it finds that it has processed all remote sites, it takes the corresponding Y branch and exits from the synchronization layer. If at 604, it finds :new.spare is not the same as old value of spare :old.spare, it means the update transaction is originated either from synchronization layer or the user does not want to it to be propagated to remote sites, and it simply resets it to 0 at 606 and exits from the layer. 606 is performed only if the layer is implemented in a before trigger and has to be taken out in after triggers. However, this limitation does not apply to database vendors since they have access to their source code and can implement it anyway which is proper. After the synchronization layer completes, the update transaction is synchronized among all database sites in the group. It is optional and may be better to create another loop and move 620 into the loop so that all related rows will be locked before any update/delete is carried out.

The delete transaction in the signaling method as specified in the in-statement signaling method is somewhat special since normally no value can be changed in the delete trigger although this limitation does not apply to database vendors since they have the source code. It must be an after-trigger, otherwise it would create an infinite loop. Other than this limitation, it starts from 608 in FIG. 6 is handled exactly the same way as the update transaction is handled except that the update statement is replaced with the corresponding delete statement at 626.

With DML transaction synchronization methods disclosed, now it is time to disclose how transactions are logged and applied to a site when the site/database experiences a crash or is brought down for maintenance and then is brought back again. Let us first start with transaction log storage. As disclosed in the synchronization logical diagrams, transactions are only logged for database in active mode with down status or passive node which could be either live or down.

There are basically two ways to store transactions that need to applied to passive sites and active site with down status. The first way is using the active nodes in synchronization group and stores the transaction locally for the failed nodes or nodes with passive mode. The second way is using an external database (it should be paired for fault tolerance and should be synchronized the same way as disclosed in the current invention). The first one is more attractive since it is more cost effective.

Figure 7:
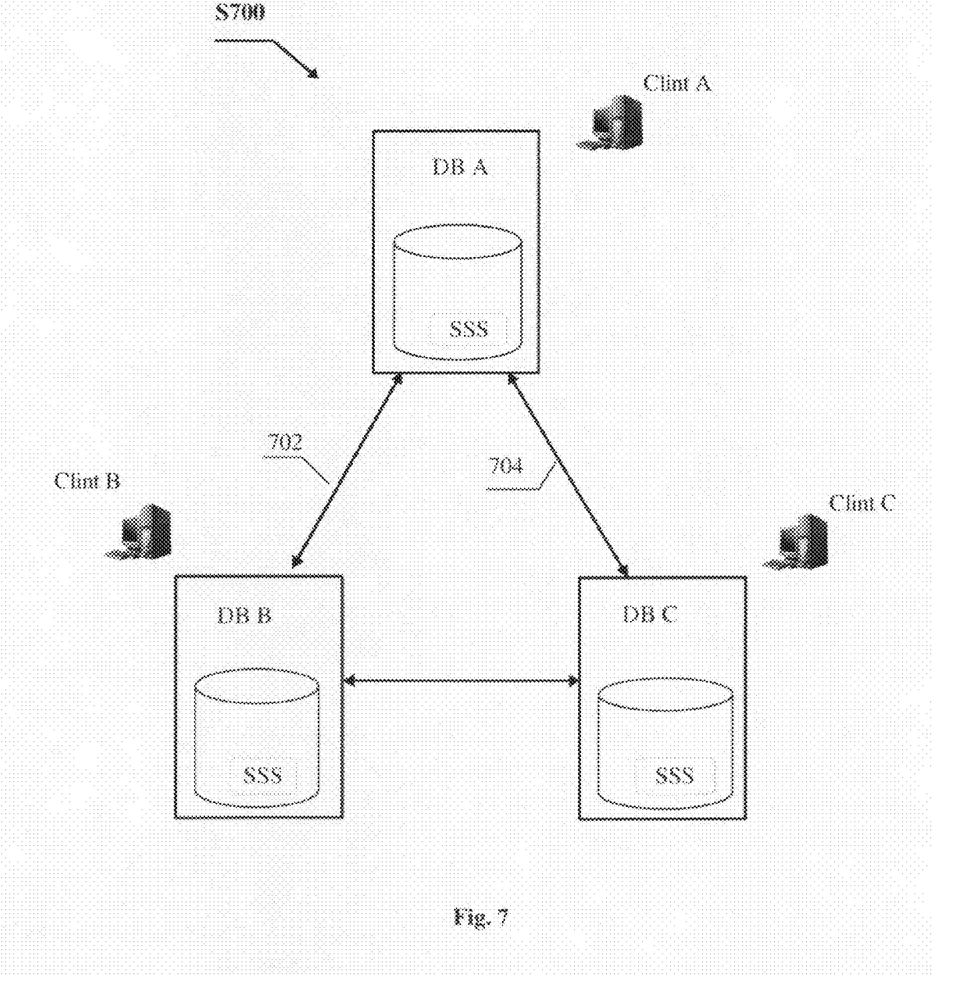
FIG. 7 shows a flow chart of a three-node or a three-site system deployed with mesh topology.

Now referring to FIG. 7, there is a system 5700 that facilitates with the synchronization layer as disclosed in the present invention. Each of the databases in the synchronization group has, but not necessarily, an exemplary Synchronization System Schema SSS. The schema SSS contains the triggers, stored procedures, and tables used by the synchronization system including the definitions of the tables that are used to store the transaction logs for the databases which are in active mode with site_status DOWN and RCVR (recovering) or are in passive mode. If database C is down, 224 in FIG. 2, 524 in FIGS. 5 and 624 in FIG. 6 logs the transactions to database C to the SSS (transaction log, see FIG. 9 and its associated descriptions for more details) schema.

If there are more than two databases in the group and transactions logs are stored within the group, two transaction logging methods using member databases in the cluster are disclosed to log transactions for crashed and passive nodes using the schema SSS.

The first way is that each surviving database logs the transactions in its very own SSS schema locally. When database C is down, the synchronization layer in database A writes the transactions which it receives into the SSS schema in database A for database C and the layer in database B writes the transactions which it receives into the SSS schema in database B for database C. The transactions written to SSS in each of the surviving databases are time stamped so that a synchronization thread at database C can pull the transaction logs from A and B, merge, order and then apply transactions in the order of timestamps of the transactions when it comes back.

The second way is to let the surviving databases decide which one serves as the logging database when a database in the synchronization group crashes. For example, the surviving database in active mode with lowest site identification number serves as the transaction log database. if C crashes and A is chosen as the logging database since it has the lowest id, the synchronization layer at both A and B will write the transaction logs for C in the SSS schema in A. If A also crashes, the only surviving database B will start writing the log into itself. If A crashes when C is recovering its data, the recovering thread for C is stopped and the recovery thread for A will start recovering its data from B. After A recovers, the recovery thread for C is restarted/resumed by first applying the transactions logged in A and then applying the transaction data from B. After all databases are recovered, the transaction logs are cleared and all databases in the group will be in synchronization and run as normal.

For both logging methods using the member databases in the cluster to store the transaction logs, all recovering processes should be stopped/suspended when a crash of a previous surviving database with unprocessed transaction logs is detected and restarted/resumed after it is recovered. As a basic rule, the last database crashed should be recovered first.

Figure 8:
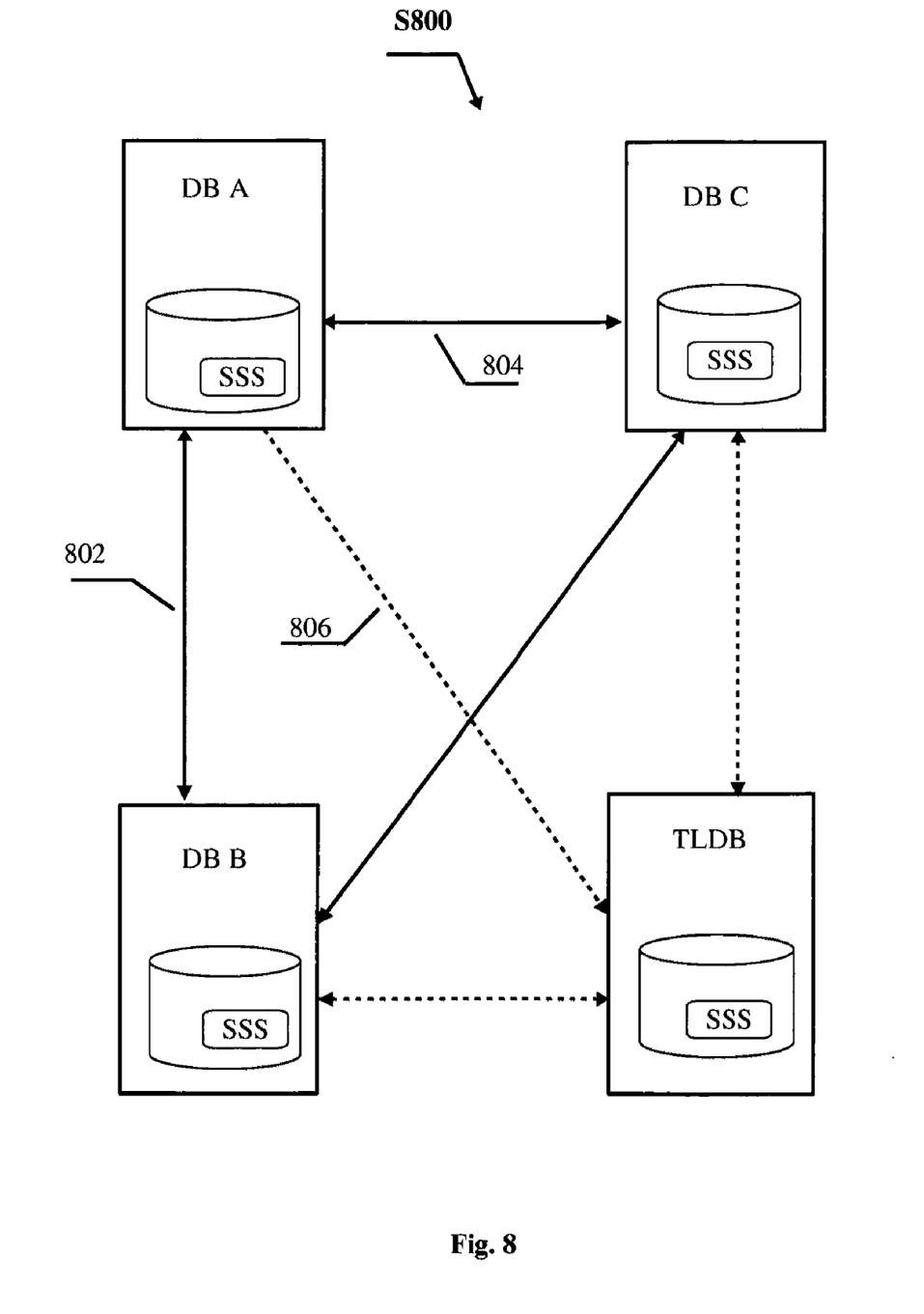
FIG. 8 shows a flow chart of a three-node/three-site system using external transaction log database to record transactions which are required to be synchronized with database experienced a crash in accordance with the present invention.

Now referring FIG. 8, there is a system S800 that facilitates the synchronization method in the present invention using an external database (TLDB, the transaction log database, which is not in the synchronization group and its SSS schema only stores the transaction logs). If any of the nodes A, B and C crashes, the transactions are logged into the TLDB at 224 in FIG. 2, 524 in FIGS. 5 and 624 in FIG. 6. The recovering threads at the previous crashed databases reads the transaction logs from the TLDB in the order of transaction log timestamps. The TLDB should be paired by facilitating the synchronization method in the present invention for increased fault tolerance. The benefit using this configuration is that databases can recover from crashes independently.

Figure 9:
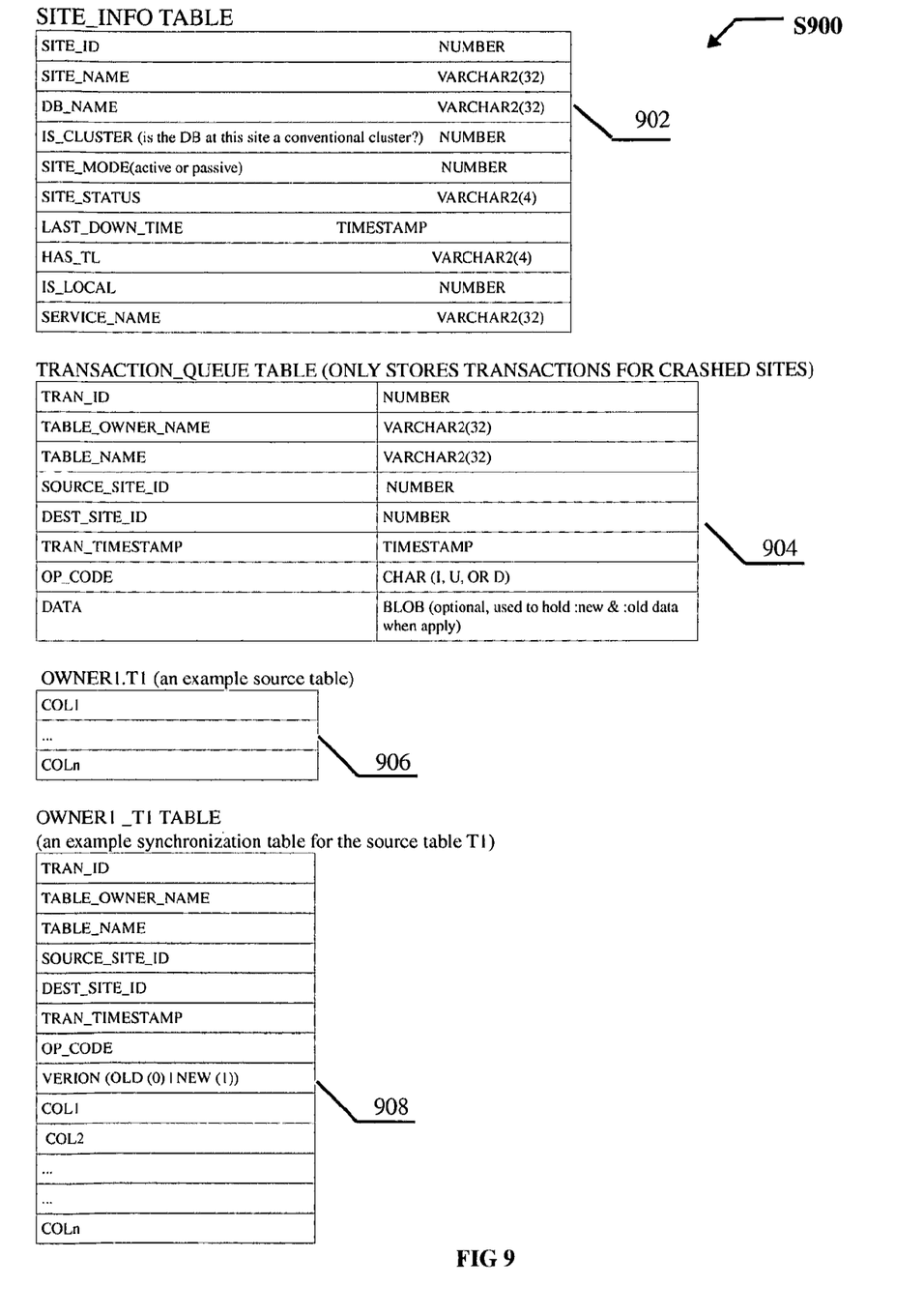
FIG. 9 shows the basic data schema of an exemplary computing environment in accordance with the present invention.

Now referring FIG. 9, S900 illustrates the basic tables that the schema SSS may contain.

902 discloses a table named SITE_INFO that contains the information of each site in the synchronization group. Column SITE_ID is the site identification number that uniquely identifies a site (a database that may be a conventional cluster database itself, for example, an Oracle Real Application cluster). Column SITE_NAME is a string that stores the site name. Column DB_NAME is the database name running at the site SITE_NAME. Column IS_CLUSTER stores the value that indicates if the database itself at SITE_NAME is a conventional cluster as defined by database vendors (such as an Oracle RAC). Column SITE_MODE stores the operating mode of the corresponding database within the synchronization group, it can be either active or passive. A database in active mode can change to passive mode if there is no user update to the database or its synchronization layer is disabled. A database in passive mode can change to active mode only if it is synchronized with other databases in the synchronization group. Active databases post DML transactions into the TRANSACTION_QUEUE table (as defined in 902) and the DML's corresponding synchronization log table defined in 908 for the passive databases and active databases that are down in the cluster. Column SITE_STATUS stores the operating status of the database, it contains, but not limited to, values of NORM (normal), DOWN, RCVR (recovering), T2N (transitioning to normal). When a database is in T2N state, all updates to databases with normal status are suspended and resumed after the database is synchronized and its status becomes NORMAL. Column LAST_DOWN_TIME stores the timestamps when the database is down. Column HAS_TL indicates if the database has logged any transaction for crashed or passive databases. Column IS_LOCAL indicates that the database is local to the site (that is, the database in local to the site. The SITE_INFO table in a database has one and only one entry with IS_LOCAL=true). Column SERVICE_NAME stores the service name of the database so that the local database knows where to connect to the database. The service name is equivalent to Oracle service name.

904 in S900 describes a table named TRANSACTION_QUEUE in the SSS schema. The table stores the transactions for the passive sites or crashed active sites. Column TRAN_ID stores the transaction identification number of the logged transaction in the transaction log hosting database. Column TABLE_ONWER_NAME stores the name of the owner of the corresponding table of the transaction. Column TABLE_NAME stores the corresponding table name of the transaction. Column SOURCE_SITE_ID stores the site identification number from which the transaction is originated. Column DEST_SITE_ID stores the site identification number of the site to which the transaction is to be synchronized to. Column TRAN_TIMESTAMP stores the timestamps of the transaction. Column OP_CODE indicates the transaction type with values (I for insert, U for update, D for delete and C for schema change) of the transaction. Column DATA stores the data for the transaction. The DATA is optional if the corresponding synchronization log table as disclosed in 908 is used and DDL synchronization is not implemented.

906 in S900 describes an example user table T1 owned by user OWNER1 in a database. It has columns COL1, COL2, . . . , COLn of any type.

908 in S900 describes the corresponding transaction log table named OWNER1_T1 that the source table 906 in S900 is mapped to in the SSS schema. Its first seven columns are exactly the same as defined in 904 in system S900. The column VERSION indicates if the logged data is new or old. If OP_CODE is I, then VERSION has value 1, if OP_CODE is U, then two rows with the same timestamps are logged into table OWNER1_T1: one row stores the old data with VERSION=0 and another row stores the new data with VERSION=1, and if OP_CODE is D, the a row with VERSION=0 is inserted into the table OWNER1_T1. The columns named COL1 through COLn are the corresponding columns in the source table as in 906. 908 is suitable for parallel recovery for fast recovery. The references and constraints in the recovering database should be disabled if parallel recovery is running and re-enabled after recovery is complete.

The length of the table names are usually limited to certain max length by database vendors (for example, the length is limited to 30 bytes in Oracle). It may not be possible to do a simple mapping from the source table to the transaction log table by simply prefixing the source table with the table owner name. To overcome this problem, a special table SSS_TABLES is created to do the mapping. The table SSS_TABLES contains the following, but not limited to, columns: TABLE_OWNER, TABLE_NAME, SSS_TALBE_NAME, SSS_IT_NAME, SSS_UT_NAME and SSS_DT_NAME. Column TABLE_OWNER is the owner name of the source table. Column TABLE_NAME is the table name of the source table. Column SSS_TALBE_NAME stores the name of the corresponding table as in 908 in the SSS schema that the source table TABLE_OWNER. TABLE_NAME is mapped to. Columns SSS_[I|U|D]T_NAME store the corresponding trigger name created on the source table TABLE_OWNER. TABLE_NAME. The SSS_columns must be unique. The trigger name columns are not needed if the mechanism is not implemented in database triggers.

The SSS_columns referred in the SSS_TABLES can be user defined. It can also be automatically generated by concatenating "SSS_[[I|U|D]T_" and "(the hash value of) TABLE_OWNER. TABLE_NAME". In order to make sure the total length of the prefix and generated hash value is within the limit as defined by database vendors, a proper hash algorithm should be used. For how to use hash function, please read the DBMS_CRYPTO package in Oracle® Database PL/SQL Packages and Types Reference.

Figure 10:
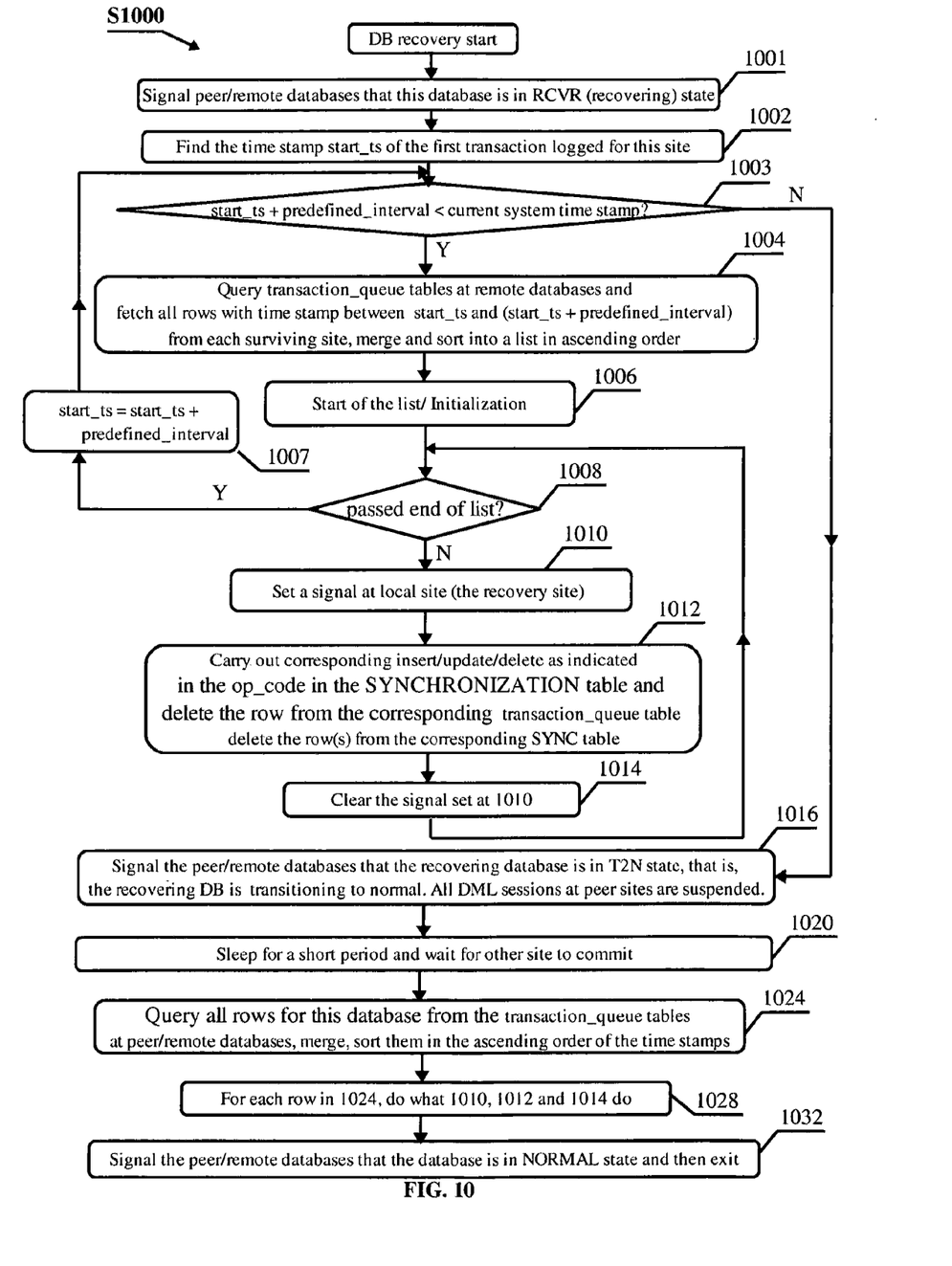
FIG. 10 shows the database recovery block diagram of a system that experienced site crash in accordance with the present invention.

Now referring to FIG. 10, there is a logical block diagram S1000 that illustrates how a database is recovered after it experiences a crash. First when a database crashes, the DOWN status of the crashed database is set in all the surviving databases in the synchronization group and the transactions to the crashed database are logged into the transaction_queue and the corresponding SYNCHRONIZATION log tables in the SSS schema. After the crashed database is brought back up, a thread is started to recover the database so that it will be synchronized with all other database before it starts to accept user requests. When the recovering thread starts, 1001 signals all peer/remote sites that this database is recovering by updating the SITE_INFO table in the peer databases. 1002 queries the TRANSACTION_QUQUE table in the peer databases and finds the earliest transaction time stamp start_ts of the transactions logged for this databases (for example, using query select min(tran_timestamp) from (select min(tran_timestamp) from transaction_ queue@ remote_database1 where dest_site_ id=this_ recovering_database_site_id union select min(tran_timestamp) from transaction_ queue@ remote_database2 where dest_site_id=this_recovering_database_site_id union . . . )). 1002 can also simply use the LAST_DOWN_TIME in the SITE_INFO table as the earliest transaction timestamps. If start_ts+predefined_interval is less than current system time stamp at 1003, it takes the Y branch to 1004. 1004 fetches all rows from each of the surviving peer databases, merge and sort them into a list based on TRANSACTION_QUEUE.TRAN_TIMESTAMP where TRANSACTION_QUEUE.TRAN_TIMESTAMP is between start_ts and start_ts+predefined_interval. 1008 checks if all items in the list are processed. If all items are processed, it sets the next start_ts to start_ts+predefined_ interval and goes back to 1003 and gets the next transaction set at 1004. If there are still items in the list not processed, it takes the N branch to 1010. 1010 sets a signal to the local site and tells its synchronization layer to ignore the DML transaction. 1012 applies the corresponding DML transaction to the local database based on the TRANSACTION_ QUEUE.OP_CODE and deletes the transaction log from the TRANSACTION_QUEUE table and the associated synchronization log tables. 1014 clears the signal set at 1010. After 1010, it loops back to 1008 until all transactions in the list are processed. If 1003 finds that start_ts+predefined_interval is greater than or equal to the current system time stamp, it determines that the recovery process is almost done and takes the N branch to 1016. 1016 signals all peer databases that the recovering database is transitioning to normal operating state (T2N), causing the peer databases to suspend all DML transactions at the synchronization layer except those DML transactions that already write the transaction log for the recovering database. 1020 sleeps for a predefined period and waits for the remaining running DML transactions to commit their data into the SSS.TRANSACTION_QUEUE. 1024 fetches all transactions from SSS.TRANSACTION_QUEUE from all peer databases, merges and sorts them into a list based on the SSS.TRANSACTION_QUEUE.TRAN_TIMESTAMP. 1028 performs what 1010, 1012 and 1014 do for each transaction in the list in 1024. After all transactions are processed the recovering database is in synchronization with all peer databases. 1032 signals all peer database that it is now in NORMAL state and exits. All databases are up and in synchronization after the recovering thread finishes.

While methods for implementing transaction logging for crashed database or database with passive mode and database recovery based on the logged data are disclosed, the normal database logs can be used to recover a crashed database since the normal database log also records both transaction and transaction timestamps and database crash time is known. If the normal database log from surviving database is transferred to a previously crashed database, the recovery process can read the log and recovers the data from the crash point using the same signaling method to disable its synchronization function during the recovery period. The materialized view log or logs captured by other change capture features provided by existing database technologies can also be used to recover a crashed database using the same signaling method. When such log methods are used, the signaling synchronization layer does not need to log the transactions explicitly for the crashed databases in the cluster.

The transaction logging and database recovery process components are not required if a system that facilitates the signaling method is required to accept updates only when all databases in the cluster are up and running. While this eliminates the need of implementing the logging component and the crash recovery component, the system is subject to single database failure for updates.

DDL commands, although it does not happen frequently and is not very important, can be synchronized among the databases in the cluster in the same manner as how DML transaction is synchronized. The only difference is how signal identifiers are generated. As in DML transaction synchronization, the concatenation of index column values is used as part of signal identifier, however in DDL synchronization, the full DDL statement is substituted for that portion and everything else can be done exactly in the same way.

A new site/database can be added to a cluster while the cluster is running. First of all, the information of the new database is added to the SITE_INFO table with status DOWN to all existing databases in the cluster, and it causes the existing databases in the cluster to log the transactions for the new database. Second, the new database is restored to the point when the new database information is added to the cluster. Third, the recovery process is run to bring the new database in synchronization with normal status.

An existing database can also be removed from a running cluster. It can be removed from the cluster by simply deleting the site information from the remaining databases in the cluster.

What has been disclosed above includes four signaling methods (database transaction and/or DML statement flagging methods) to create a real-time cluster. It is, of course, not possible to describe every conceivable signaling method for the purposes of describing the present invention, but one with the ordinary skill in the art may find that many slight variations of signaling methods of the present invention are possible. Accordingly, the present invention is intended to embrace all such alternations and variations that fall within the spirit and scope of the appended claims.

What is claimed is:

1. A method for replicating a table in a source database to a target database in real time in active-active topology, comprising:
    executing a Data Manipulation Language (DML) from a session to the source database to produce one or more row change data;
    receiving the row change data before a commit statement is issued from the session of the source database;
    determining if the row change data of the table is replicated data by examining the change data source origin information signal;
    clearing the signal if session level signal scope is not used and if the said determining step indicates that the row change data is replicated data;
    if the said determining step indicates that the row change data is not replicated data, if the target database is online, and if session level signaling scope is not used:
        sending a signal where the target database can read it;
    if the said determining step indicates that the row change data is not replicated data, and if the target database is online:
        applying the row change data to the table in the target database via a distributed transaction processing service that lets the client coordinate updates across two or more databases and treat those transactions as a single transaction;
    if the said determining step indicates that the row change data is not replicated data and if the target database is offline, passive or maintenance state:
        logging the row change data.

2. The method of claim 1, further comprises:
commits or rolls back at the same time the transaction in the source database, its replicated transaction(s) to the target database(s) and its log transaction for the target database(s) if the target database(s) is in offline, passive or maintenance state.

3. The method of claim 1, further comprises:
the replications for transactions from different user sessions are processed in parallel.

4. The method of claim 1 further comprises:
creates a shared-nothing real time database cluster when all tables are replicated in all databases in the cluster.

* * * * *